United States Patent [19]

Ramunas

[11] Patent Number: 4,597,699
[45] Date of Patent: Jul. 1, 1986

[54] QUICK-CONNECT MECHANISM

[75] Inventor: Valdas S. Ramunas, Euclid, Ohio

[73] Assignee: Erickson Tool Company, Solon, Ohio

[21] Appl. No.: 644,640

[22] Filed: Aug. 27, 1984

[51] Int. Cl.⁴ .............................................. B23C 5/26
[52] U.S. Cl. ...................................... 409/232; 279/4; 279/78; 408/239 A; 409/234
[58] Field of Search ....................... 409/232, 239, 136; 408/239 R, 239 A; 82/36 B; 279/1 B, 71, 77, 78, 81, 90, 91, 93, 103, 1 E, 6, 19.3, 20, 4

[56] References Cited

U.S. PATENT DOCUMENTS

| | | | |
|---|---|---|---|
| 1,824,509 | 9/1931 | Snader | 279/6 X |
| 3,342,502 | 9/1967 | Young. | |
| 3,741,573 | 6/1973 | Treer | 279/81 |
| 3,999,769 | 12/1976 | Bayer et al. | |

FOREIGN PATENT DOCUMENTS

| | | |
|---|---|---|
| 262662 | 8/1912 | Fed. Rep. of Germany. |
| 1818909 | 9/1960 | Fed. Rep. of Germany. |
| 236266 | 6/1945 | Switzerland. |
| 270900 | 1/1951 | Switzerland. |
| 347406 | 8/1960 | Switzerland. |

Primary Examiner—Z. R. Bilinsky
Attorney, Agent, or Firm—Pearne, Gordon, Sessions, McCoy, Granger, Tilberry

[57] ABSTRACT

A quick-connect and quick-disconnect mechanism includes a male member which may be received in a female socket member. Cam means is journaled in an eccentric cam follower surface in the socket and is capable of rotation about a second axis displaced from the axis of the socket. A locking surface on the cam means faces in a longitudinal direction opposite the entrance of the socket and opposite that of a lockable abutment surface on the male member. An aperture in the cam means is sufficiently large to accommodate the entrance of the lockable abutment surface on the male member. The cam means is rotatable within the cam follower surface to move the cam locking surface with a radially inward component and a component of movement in a longitudinal direction away from the entrance of the socket to engage the lockable abutment surface to lock the male member in the socket. The cam means may also have an expelling surface to aid in expelling the male member from the socket. The foregoing abstract is merely a resume of one general application, is not a complete discussion of all principles of operation or applications, and is not to be construed as a limitation on the scope of the claimed subject matter.

15 Claims, 5 Drawing Figures

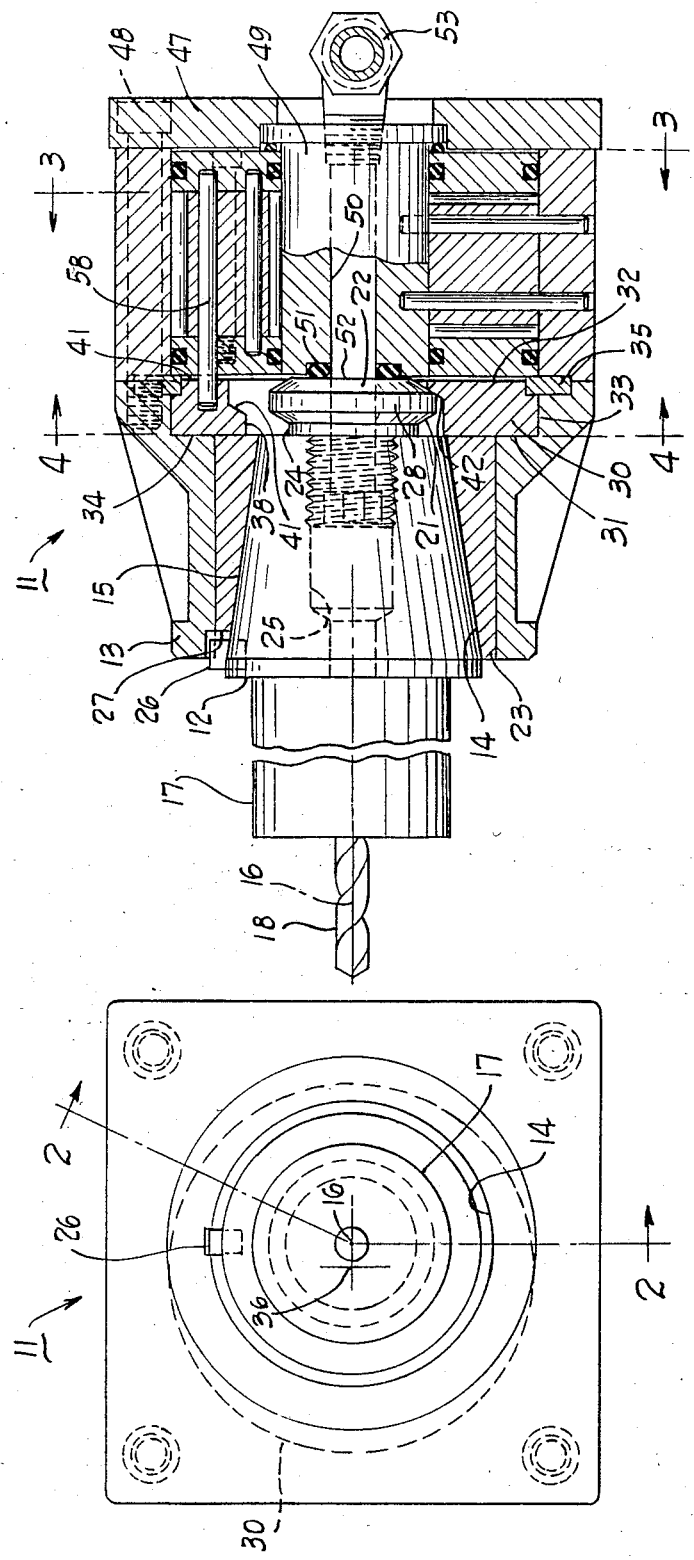

QUICK-CONNECT MECHANISM

BACKGROUND OF THE INVENTION

Coupling devices to interconnect two members have taken many different forms. In the machine tool field, tool holders are coupled to tool holder sockets and secured therein in many different ways. A typical tool holder socket may be cylindrical or conical, and the conical types have known a threaded drawbar coaxially with the tool holder and within the socket to draw the tool holder tightly into seated engagement in the work holder socket.

U.S. Pat. No. 1,062,630 shows segmented jaws moved by a screw-threaded member into engagement in a groove in the tool.

In recent years, tool holders have been more widely used in the tool holder sockets, and the tool holders, in turn, receive different-sized tools. Self-locking conical tapers have been used, such as shown in U.S. Pat. No. 3,024,030. After use, the tool holder must be driven out to be removed. To secure the tool holders in the socket, an annular groove has been used on the tool holder with radially movable jaws engaging the groove, as in U.S. Pat. No. 3,999,769.

A threaded drawbar to secure a conical tool holder in a conical socket is shown in U.S. Pat. No. 4,412,766.

U.S. Pat. No. 3,759,536 shows a conical tool holder in a conical socket which is secured in the socket by means of a T-shaped head at the small end of the cone which fits through an aperture in a threaded member, and then the threaded member is rotated to tighten the tool holder into the socket.

U.S. Pat. No. 4,328,975 shows a conical tool holder with a circular flange at the large end of the cone and a rotatable locking member acting on this circular flange to secure the tool holder in the socket.

The complicated structures of the prior art illustrate the difficulties in providing a coupling or interconnection mechanism which is positive locking yet is easily connected and disconnected.

SUMMARY OF THE INVENTION

The problem to be solved, therefore, is how to construct a quick-connect mechanism which is simple, reliable, and positive, yet quick-acting in both connection and disconnection.

This problem is solved by a quick-connect mechanism including a male member and a socket therefor, said socket having a longitudinal aperture disposed along an axis and adapted to receive said male member coaxial therewith, said male member having a lockable abutment surface facing in a first longitudinal direction toward the entrance of said socket, cam means journalled in an eccentric cam follower surface on said socket for rotation about a second axis displaced from the axis of said socket, an aperture in said cam means sufficiently large to accommodate the entrance of the lockable abutment surface on said male member, a first diametral axis of symmetry through said cam follower surface bisecting high and low points thereof, a locking surface on said cam means facing in a second longitudinal direction opposite that of said lockable abutment surface, and means to rotate said cam means in first and second opposite rotational directions whereby rotation in said first rotational direction rotates said cam locking surface toward said high point of said cam follower surface to move said cam locking surface with a radially inward component and with a component of movement in said second longitudinal direction to engage said lockable abutment surface to lock said male member in said socket, and whereby rotation of said cam in said second rotational direction unlocks said cam locking surface from said lockable abutment surface.

Accordingly, an object of the invention is to provide a quick-connect mechanism with only a single moving part.

Another object of the invention is to provide a mechanism for both quick connection and quick disconnection which has both positive locking and positive expelling features.

A further object of the invention is to provide a quick-connect mechanism with a single circular cam disc which is eccentrically mounted in the tool holder socket for positive locking and ejection of a tool holder.

Other objects and a fuller understanding of the invention may be had by referring to the following description and claims, taken in conjunction with the accompanying drawing.

BRIEF DESCRIPTION OF THE DRAWING

FIG. 1 is a front elevational view of a tool holder socket embodying the invention;

FIG. 2 is a sectional view on line 2—2 of FIG. 1;

DESCRIPTION OF THE PREFERRED EMBODIMENT

Figure 3:
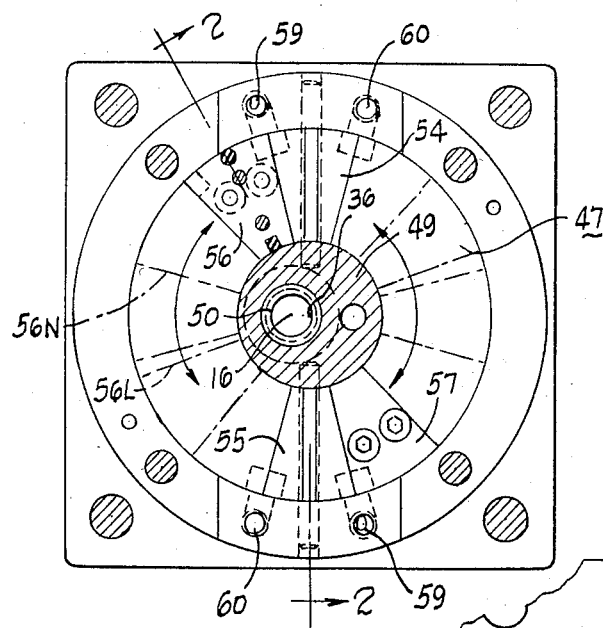
FIG. 3 is a sectional view on line 3—3 of FIG. 2.

FIGS. 1-5 illustrate a quick-connect and quick-disconnect mechanism 11 constructed in accordance with the invention. This mechanism 11 may be used with hoses and other conduits as a quick-connect connection for passage of fluid under pressure, or it may be used to interconnect almost any two members. In the drawings, the mechanism 11 is shown as including a male member 12 and a female member or socket member 13. The socket member 13 has a longitudinal aperture 14 to closely receive the male member 12. In the case of many tool holder mechanisms, this may be a cylindrical aperture, but is shown as a conical aperture against which a male cone 15 on the male member 12 may seat. The longitudinal aperture 14 is disposed along a longitudinal axis 16, and the male member 12 is adapted to be coaxial therewith.

The male member 12 may be a tool holder to receive a rotatable or stationary tool, and in the present drawings, it is shown as receiving a stationary tool which carries a fluid motor 17 adapted to actuate a tool such as pincers on a robot-actuated arm, or, as shown, adapted to rotate a tool such as a drill 18 relative to the male cone 15. The male member 12 has a lockable abutment surface 21 and an expulsion surface 22. The lockable abutment surface faces in a first longitudinal direction, which is toward the entrance 23 or large end of the conical longitudinal aperture 14. This is toward the left as viewed in FIG. 2. The expulsion surface 22 faces in the opposite or second longitudinal direction toward the right as viewed in FIG. 2. In the preferred embodiment, in order to achieve this lockable abutment surface 21, an annular groove 24 is formed on the small end of the male cone 15, and this establishes an annular button 28 with the surfaces 21 and 22 as annular, and in this case, circular. These surfaces 21 and 22 in this embodiment are conical surfaces established, for example, at a 120-degree included angle. The male cone 15 has a fluid passageway 25 extending coaxially therethrough for passage of fluid to actuate the fluid motor 17 and carries a pin or key 26 to enter a keyway 27 at the entrance 23 of the socket 13 to prevent relative rotation between the male cone 15 and the socket member 13.

Cam means 30 is mounted for movement in the socket member 13. In the preferred embodiment, this cam means is a single cam disc having front and rear faces 31 and 32, respectively, and a circular periphery 33. The cam means 30 is journaled for rotation in the socket member 13 and is mounted in a circular recess 34 which is an eccentric cam follower surface. The recess 34 is circular about a second axis 36 spaced from the first axis 16. In the preferred embodiment, these axes are parallel. A ring 35 engages the rear face 32 to hold the cam means 30 in this recess 34.

The cam means 30 has an aperture 38, in this case near the center of the cam means, to accommodate the entrance of the lockable abutment surface 21 on the button 28. A first diametral axis of symmetry 39 bisects high and low points of the cam follower surface 34. This axis 39 is shown on FIGS. 4 and 5, with the high point 40 of the cam follower surface on the right side and the low point on the left side of FIGS. 4 and 5, as explained below.

The cam means 30 includes a locking surface 41 and an expelling surface 42 as part of the aperture 38. The cam locking surface 41 faces in the second longitudinal direction, toward the right as viewed in FIG. 2, and the cam expelling surface 42 faces in the first longitudinal direction. In this preferred embodiment, these locking and expelling surfaces are partially conical, and are complementary to the lockable abutment surface 21 and the expulsion surface 22, respectively. To this end, they are disposed at a 120-degree included conical angle. The aperture 38 has a small radius cut-out 43 which helps define one end of each of the locking and expelling surfaces. The cam means 30 has a second diametral axis of symmetry 44 which bisects the high and low point on this cam means 30. The high point 45 is at the left end of the second axis, as viewed in FIG. 5.

The cam means 30 may be manually rotatable, may be spring-urged in at least one direction, may be moved by a rack and pinion but, as shown in the preferred embodiment, is moved by a fluid motor 47. This fluid motor is secured to the socket member 13 by machine screws 48 to hold the ring 35 in place. The fluid motor 47 has a central hub 49 and the axis of this hub is the second axis 36, about which the cam follower surface 34 is coaxial. A fluid passageway 50 is coaxial with the first longitudinal axis 16 and registers with the fluid passageway 25 in the male cone 15. An O-ring 51 seals the hub 49 against the end surface 52 of the male member 12, at the button 28, formed by the annular groove 24. This O-ring 51 seals the fluid pressure within the passageways 25 and 50, which fluid may be air to actuate the fluid motor 17. A fluid fitting 53 admits fluid to the passageways.

The fluid motor 47 has two fixed vanes 54 and 55 and two rotary vanes 56 and 57 which may rotate the cam means 30 a maximum of 120 degrees, by means of longitudinal pins 58. Fluid, such as air, may be introduced into the two inlets 59 or, alternatively, into two other inlets 60. When introduced into the inlets 59, as shown in FIG. 3, this induces a first rotational direction of counterclockwise rotation to the rotary vanes 56 and 57 toward a locked condition of the male member. Fluid introduced into the inlets 60 induces a second rotational direction of movement of the rotary vanes 56 and 57 in a clockwise direction to the expelling position, as shown in FIG. 3. The rotation in the first rotational direction rotates the cam locking surface 41 toward the high point 40 of the cam follower surface 34.

Operation

FIGS. 1, 2, 3, and 4, show the quick-connect and quick-disconnect mechanism 11 in the expelling position. As shown in FIG. 2, the cam expelling surface 42 is in engagement with the expulsion surface 22 on the button 28 of the male member 12. This prevents complete seating of the male cone 15 in the socket 13. When the cam means 30 is rotated in the first rotational direction, which is counterclockwise in FIG. 3 and clockwise in FIGS. 1, 4, and 5, e.g., by fluid pressure in the inlets 59, locking of the male member 12 results. In more detail, the vane 56 is rotated about 90 or 100 degrees from the position shown in FIG. 3 to the locked condition 56L, shown in dot-dash lines in FIG. 3. At this position shown in FIG. 5, the cam locking surface 41 on the cam means 30 is wedged against the lockable abutment surface 21 on the male member 12. This locks the male member 12 in the socket 13.

In still further detail, this movement may be considered as being caused by two different things: (1) the eccentric mounting of the cam disc 30 gives a radially inward component of movement to the locking surface 41; and (2) the conical surface on the cam locking surface 41 plus the aforementioned radial inward movement gives a component of movement in the second longitudinal direction, to the right in FIG. 2, which wedges or locks the male member 12 in the socket 13. Further, the conical surface of the lockable abutment surface 21 establishes a surface or area contact rather than merely a line contact between the cam locking surface 41 and the lockable abutment surface 21.

When the fluid motor 47 and cam disc 30 are moved in the second rotational direction, clockwise as viewed in FIG. 3, the mechanism 11 is moved through an open position, to the expelling position shown in solid lines in FIG. 3. The open or neutral position is shown in FIG. 3 by the dot-dash lines 56N position of the rotary vane 56. In the open position, the male member 12 is free to withdrawn, but if it is not readily disengaged from the socket 13, when the cam means 30 is moved to the expelling position, the cam expelling surface 42 engages the expulsion surface 22 on the male member 12 to positively expel this male member. This is shown in FIGS. 2 and 4.

Figure 4:
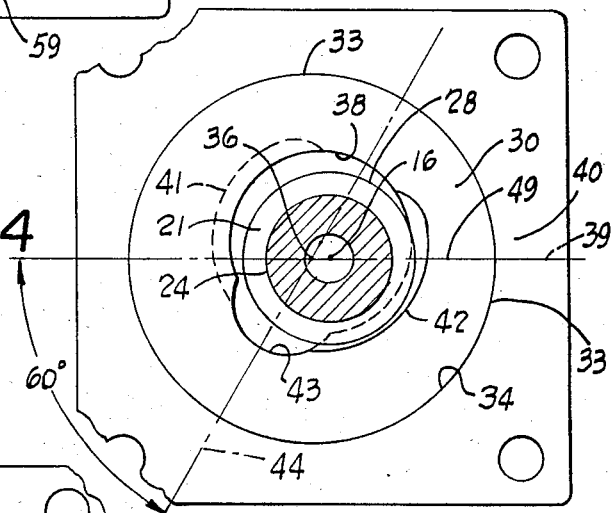
FIG. 4 is a sectional view on line 4—4 of FIG. 2.
Figure 5:
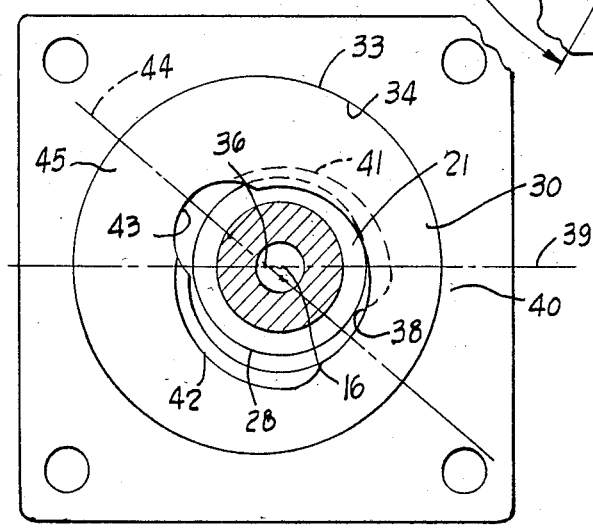
FIG. 5 is a view similar to that of FIG. 4, but with the cam means in the locking position.

FIGS. 4 and 5 illustrate expelling and locking positions, respectively, and it will be noted that the cut-out 43 of aperture 38, disposed on the second axis of symmetry 44, is displaced on opposite sides of the first axis of symmetry 39. For the locking action to take place, the cam locking surface 41 moves toward the high point 40 of the cam follower surface 34 and, similarly, to effect the expelling action, the cam expelling surface 42 moves toward the high point 40 of the cam follower surface 34. The cut-out 43 establishes the termination at one end of the cam locking and expelling surfaces, so that one does not interfere with the other in their separate action on the male member 12. It will be appreciated from a view of the drawings that the cam means 30 is a simple, single member easily machined. The periphery is circular and the aperture 38 is readily machined by milling with two different diameter tools. The locking and expelling surfaces are milled from opposite sides with a milling tool having a 30-degree taper on the end thereof, considering that the preferred embodiment has the 120-degree included conical angle. FIGS. 4 and 5 show that the cam locking surface 41 is on one side of the second diametral axis of symmetry 44 and the cam expelling surface 42 is on the other side of this axis.

The cam means 30 is a single member, with a periphery at least part of which is circular, so as to be journaled within the circular cam follower surface 34. In the preferred embodiment, this cam means 30 is a continuous annular disc member for rigidity and simplicity of manufacture.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A quick-disconnect mechanism including a male member and a socket therefor, said socket having a longitudinal aperture disposed along an axis and adapted to receive said male member coaxial therewith, said male member having a lockable abutment surface facing in a first longitudinal direction toward the entrance of said socket;
   cam means journalled in an eccentric cam follower surface on said socket for rotation about a second axis displaced from the axis of said socket;
   an aperture in said cam means sufficiently large to accommodate the entrance of the lockable abutment surface on said male member;
   a first diametral axis of symmetry through said cam follower surface bisecting high and low points thereof;
   a conical locking surface on said cam means facing in a second longitudinal direction opposite that of said lockable abutment surface;
   and means to rotate said cam means in first and second opposite rotational directions whereby rotation in said first longitudinal direction rotates said cam locking surface toward said high point of said cam follower surface to move said cam conical locking surface with a radially inward component and with a component of movement in said second longitudinal direction to engage said lockable abutment surface to lock said male member in said socket;
   and whereby rotation of said cam in said second rotation direction unlocks said cam locking surface from said lockable abutment surface.

2. A quick-connect mechanism as set forth in claim 1, including an expelling surface on said cam means operable upon rotation of said cam in said second direction to expel said male member.

3. A quick-connect mechanism as set forth in claim 2, wherein said cam expelling surface faces said first longitudinal direction.

4. A quick-connect mechanism as set forth in claim 3, including an expulsion surface on said male member facing said second longitudinal direction and cooperable with said cam expelling surface with said cam means rotated in said second direction.

5. A quick-connect mechanism as set forth in claim 4, including an annular groove on said male member defining an annular flange, and with said lockable abutment surface and said expulsion surface being formed on opposite sides of said flange.

6. A quick-connect mechanism as set forth in claim 1, wherein said rotation means includes a fluid motor.

7. A quick-connect mechanism as set forth in claim 1, wherein said cam means has a second diametral axis of symmetry bisecting high and low points thereof; and
   said cam locking surface being near said high point of said cam means.

8. A quick-connect mechanism as set forth in claim 7, wherein said cam locking surface is on one side of said second diametral axis of symmetry.

9. A quick-connect mechanism as set forth in claim 8, including a male member expelling surface on said cam means on the opposite side of said second diametral axis of symmetry.

10. A quick-connect mechanism as set forth in claim 1, wherein said lockable surface is conical.

11. A quick-connect mechanism as set forth in claim 1, wherein said second axis is parallel to said axis of said socket.

12. A quick-connect mechanism as set forth in claim 1, including a fluid passageway substantially coaxially through said socket and male member for fluid flow.

13. A quick-connect mechanism as set forth in claim 12, wherein said cam follower surface is circular surrounding said fluid passageway.

14. A quick-connect mechanism as set forth in claim 1, wherein said cam means is a single member with a periphery at least part of which is circular.

15. A quick-connect mechanism as set forth in claim 1, wherein said socket has a conical seat complementary to a conical portion on said male member and said conical portion being established tightly in said conical seat by said cam locking surface.

* * * * *